US006902160B1

(12) United States Patent
Zajac, Jr. et al.

(10) Patent No.: US 6,902,160 B1
(45) Date of Patent: Jun. 7, 2005

(54) LOCATING PIN WITH INTEGRATED CLAMP

(75) Inventors: Theodore S. Zajac, Jr., Elyria, OH (US); Brian K. Thompson, Cleveland, OH (US)

(73) Assignee: Zaytran, Inc., Elyria, OH (US)

( * ) Notice: Subject to any disclaimer, the term of this patent is extended or adjusted under 35 U.S.C. 154(b) by 44 days.

(21) Appl. No.: 10/453,977

(22) Filed: Jun. 4, 2003

Related U.S. Application Data

(60) Provisional application No. 60/441,771, filed on Jan. 22, 2003, provisional application No. 60/448,054, filed on Feb. 17, 2003.

(51) Int. Cl.[7] .................................................. B23Q 1/00

(52) U.S. Cl. ............................ 269/49; 269/32; 269/24; 269/34

(58) Field of Search ............................. 269/49, 32, 24, 269/34, 74, 66, 53, 54, 91–94, 228–229, 269/232–234, 237

(56) References Cited

U.S. PATENT DOCUMENTS

| | | | | |
|---|---|---|---|---|
| 2,313,843 | A | 3/1943 | Shaff | |
| 2,313,846 | A * | 3/1943 | Tamminga | 222/638 |
| 4,618,131 | A * | 10/1986 | Campisi et al. | 269/32 |
| 4,921,233 | A * | 5/1990 | Fabrice | 269/32 |
| 5,490,663 | A * | 2/1996 | Stojkovic et al. | 269/32 |
| 6,079,896 | A * | 6/2000 | Dellach | 403/322.3 |
| 6,102,383 | A * | 8/2000 | Tunkers | 269/24 |
| 6,113,086 | A * | 9/2000 | Yonezawa | 269/24 |
| 6,220,588 | B1 * | 4/2001 | Tunkers | 269/32 |
| 6,378,855 | B1 | 4/2002 | Sawdon et al. | |
| 6,439,560 | B2 * | 8/2002 | Sawada et al. | 269/32 |
| 6,550,433 | B2 | 4/2003 | Vorih et al. | |
| 6,607,198 | B2 * | 8/2003 | Szendel | 280/11.27 |
| 6,612,557 | B2 * | 9/2003 | Sawdon et al. | 269/32 |
| 6,648,316 | B1 * | 11/2003 | Vouland | 269/24 |
| 6,698,736 | B2 * | 3/2004 | Dugas et al. | 296/32 |
| 2001/0003388 | A1 * | 6/2001 | Takahashi et al. | 269/32 |
| 2001/0038175 | A1 * | 11/2001 | Nagai et al. | 269/237 |

(Continued)

FOREIGN PATENT DOCUMENTS

JP 409144715 A * 6/1997 ............. F16Z 1/02

(Continued)

*Primary Examiner*—Joseph J. Hail, III
*Assistant Examiner*—Bryan R Muller
(74) *Attorney, Agent, or Firm*—Eschweiler & Associates LLC

(57) ABSTRACT

The present invention is directed to a locating and clamping fixture for locating and clamping a workpiece, wherein the fixture comprises a generally hollow body and a floating clamping arm. A first cam follower is located within the body, and a drive pin comprising a second cam follower and having a first axis associated therewith is moveable within the body along the first axis. The floating clamping arm comprises a first cam surface, a second cam surface, and a gripping portion, wherein the first cam surface and the second cam surface are operable to respectively engage the first cam follower and the second cam follower. Upon an application of a driving force by the drive pin, the clamping arm is operable to rotate and linearly translate with respect to the body via a translational movement of the drive pin along the first axis, wherein the gripping portion of the clamping arm is operable to extend over the workpiece and to clamp the workpiece to the body.

19 Claims, 8 Drawing Sheets

U.S. PATENT DOCUMENTS

| | | | | |
|---|---|---|---|---|
| 2002/0093131 | A1 | 7/2002 | Dugas et al. | |
| 2002/0135116 | A1 | 9/2002 | Dugas et al. | |
| 2004/0041323 | A1 * | 3/2004 | Migliori | 269/32 |

FOREIGN PATENT DOCUMENTS

| | | | | | |
|---|---|---|---|---|---|
| JP | 09192968 | A | * | 7/1997 | B23Q 3/18 |
| JP | 2001227512 | A | * | 8/2001 | F16B 2/06 |

* cited by examiner

LOCATING PIN WITH INTEGRATED CLAMP

RELATED APPLICATION

This application claims priority to Ser. No. 60/441,771 filed Jan. 22, 2003, which is entitled "Locating Pin with Integrated Clamp", and Ser. No. 60/448,054 filed Feb. 17, 2003, which is entitled "Locking Mechanism for an End Effector", which are incorporated herein by reference in their entirety.

TECHNICAL FIELD OF INVENTION

The present invention relates to a fixture for locating and clamping a workpiece. More specifically, the present invention relates to a floating clamping arm which is easily removable from the fixture.

BACKGROUND OF THE INVENTION

Automated pneumatic clamping devices are commonly utilized in manufacturing environments to secure a workpiece, such as a sheet metal part, to a base for processing, such as welding, punching, or assembly with other parts. Generally, conventional clamping devices comprise a piston and cylinder, wherein the piston is operable to translate within the cylinder in order to force a clamping member to rotate about an axis. FIG. 1 illustrates an exemplary prior art clamping mechanism 10 comprising a clamping member 12 which is rotatably coupled to a housing 14 via a fixed pivot pin 16. The clamping mechanism 10 is operable to generally clamp a flat part 18 between an end 20 of the clamping member 12 and the housing 14 by the application of air pressure to a cylinder 22. The application of air pressure to the cylinder 22 generally causes a piston 24 to translate therein, wherein a drive pin 26 associated therewith is operable to generally rotate the clamping member 12 about a single axis 28 associated with the fixed pivot pin 16.

Typically, the clamping member 12 is considered a wearable part, wherein the clamping member is replaced regularly. The clamping member 12 of the prior art, however, has typically been fairly difficult to remove from the housing 14, because a removal of several other components associated with the clamping member is typically required prior to the removal of the clamping member. Conventionally, the fixed pivot pin 16 is generally fixed to the housing 14 and the clamping member 12 is generally coupled to the pivot pin 16 via a hole 30 in the clamping member. Such a pin and hole arrangement, therefore, typically requires the pivot pin 16 to be removed from the housing 14 in order to remove and replace the clamping member 12. Furthermore, other components such as a location pin 32, and/or other components are also typically removed prior to the removal of the clamping member 12 from the housing 14. Removal of such components can increase maintenance time and cost associated with the prior art clamping mechanism 10.

Furthermore, many applications exist wherein the workpiece 18 comprises an upward-facing flange 34, and wherein a locking arm 36 associated with the clamping member 12 must clear the flange, yet still provide an adequate clamping force to the workpiece. The presence of the flange 34 can cause difficulties when dealing with conventional clamping mechanisms, since the conventional clamping mechanisms are generally limited to the fixed axis 28 of rotation of the clamping member 12.

Still further, typical pneumatic clamping devices of the prior art operate via a gas pressure (e.g., 60 PSI or greater) being applied to a first portion 38 or a second portion 40 of the cylinder 22 via a respective first port 42 or second port 44 which is in fluid communication with the cylinder. The piston 24 is generally forced by the gas pressure between a first position 46 and a second position 48 within the cylinder 22, depending on which of the first port 42 or the second port 44 is pressurized. Gas which resides in the second portion 38 of the cylinder 22, for example, is generally exhausted to atmosphere via the second port 44 upon an application of the gas pressure to the first port 42, thus causing the piston 24 to translate from the first position 46 to the second position 48. In general, a velocity of the piston 24 translating within the cylinder 22 rapidly accelerates upon the application of gas pressure to either of the first port 42 or the second port 44, and rapidly decelerates once the piston has reached an end 50 of the cylinder.

The travel seen by the piston 24 between the ends 50 of the cylinder 22 generally defines a stroke S of the piston. Typically, the rapid deceleration at the end of the stroke S of the piston 24 can produce unwanted impact forces, both to components of the pneumatic device 10 such as the piston 24, cylinder 22, drive pin 26, and clamping member 12, as well as undesirable forces exerted on the workpiece 18, wherein undesirable effects such as deformations or dimples may result in the workpiece. Conventional attempts to minimize the impact forces at the ends of the stroke S have included, for example, cushioning devices, such as a "snubber". A typical snubber 52 illustrated in FIG. 1 comprises an additional self-contained snubber piston 54 and snubber cylinder 56, wherein a translational velocity of the snubber piston is generally limited by a gas or spring 58 residing within the snubber cylinder. Typically, the snubber 52 is arranged within the pneumatic device 10 such that the piston 24 of the pneumatic device contacts the snubber piston 56 near the end 50 of the stroke S of the pneumatic device, wherein the translation of the snubber piston generally slows the translation of the pneumatic device piston. Conventional cushioning devices for limiting impact forces, however, are generally prone to wear, and furthermore add complexity to the pneumatic device.

Therefore, a need exists for a clamping fixture which provides for easy removal of the clamping member from the fixture, as well as a need for a simple apparatus for minimizing impact forces seen in pneumatic devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention is directed toward a device for locating and clamping a workpiece. According to one exemplary aspect of the present invention, a locating and clamping fixture is disclosed, wherein the locating and clamping fixture comprises a generally hollow body and a floating clamping arm, wherein the floating clamping arm is generally easily removable from the hollow body. The fixture, for example, further comprises a first cam follower located within the hollow body and a drive pin operable to translate along a first axis associated therewith. The drive pin further comprises a second cam follower, wherein the second cam follower is further operable to translate along the first axis in conjunction with the translation of the drive pin.

The floating clamping arm disclosed in the present invention comprises a first cam surface, a second cam surface, and a gripping portion, wherein the first cam surface and the second cam surface, for example, are operable to respectively engage the first cam follower and the second cam follower. The first cam surface and the second cam surface, for example, are generally open-looped in configuration, wherein the first cam follower and the second cam follower are operable to be disengaged from the first cam surface and the second cam surface, respectively.

The drive pin is further operable to provide a driving force to the clamping arm, wherein upon an application of the driving force to the clamping arm, the clamping arm is operable to rotate and linearly translate with respect to the body. The gripping portion of the clamping arm, for example, is further operable to extend over the workpiece, wherein the gripping portion is operable to generally clamp the workpiece to the body.

According to another exemplary aspect of the present invention, the locating and clamping fixture further comprises a locating pin, wherein the locating pin is operable to generally locate the workpiece with respect to the hollow body. The locating pin, for example, is generally hollow, and comprises an aperture therethrough, wherein the gripping portion of the floating clamping arm is operable to selectively translate through the aperture upon the application of the driving force.

In accordance with yet another exemplary aspect of the present invention, an anti-rotation mechanism is provided, wherein the anti-rotation mechanism generally limits a rotation of the drive pin with respect to the hollow body. According to another exemplary aspect of the present invention, a piston and cylinder are associated with the hollow body, wherein the piston is operably coupled to the drive pin, and wherein an application of compressed gas within the cylinder is operable to translate the piston with respect to the cylinder, thereby providing the driving force.

According to still another exemplary aspect of the present invention, the locating and clamping fixture comprises a locking mechanism, wherein upon a loss of the driving force, the locking mechanism is operable to generally maintain a position of the floating clamping arm with respect to the body. The drive pin, for example, comprises a driver portion and a driven portion, wherein the driver portion and the driven portion are operable coupled to one another. The locking mechanism, for example, comprises one or more rollers associated with the body, the driver portion and the driven portion of the drive pin, wherein the one or more rollers are generally operable to selectively translate within the body, as well as to selectively limit a translation of the clamping arm, depending on a position of the drive pin.

Furthermore, in accordance with another exemplary aspect of the present invention, a cushioning mechanism is disclosed, wherein the cushioning mechanism is operable to limit an impact force associated with a piston within a cylinder. For example, the cushioning mechanism comprises one or more cushioning pins associated with the piston, and one or more respective cushioning holes associated with the cylinder. The one or more cushioning holes, in conjunction with the one or more respective cushioning pins, for example, are operable to generally selectively limit a fluid communication between an interior portion of the cylinder with one or more respective ports associated with the cylinder. The one or more cushioning pins, for example, are operable to translate into and out of the one or more cushioning holes, wherein a flow of compressed gas between the interior portion of the cylinder and the one or more ports is generally limited by the cushioning pins, depending on the location of the piston with respect to the cylinder.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
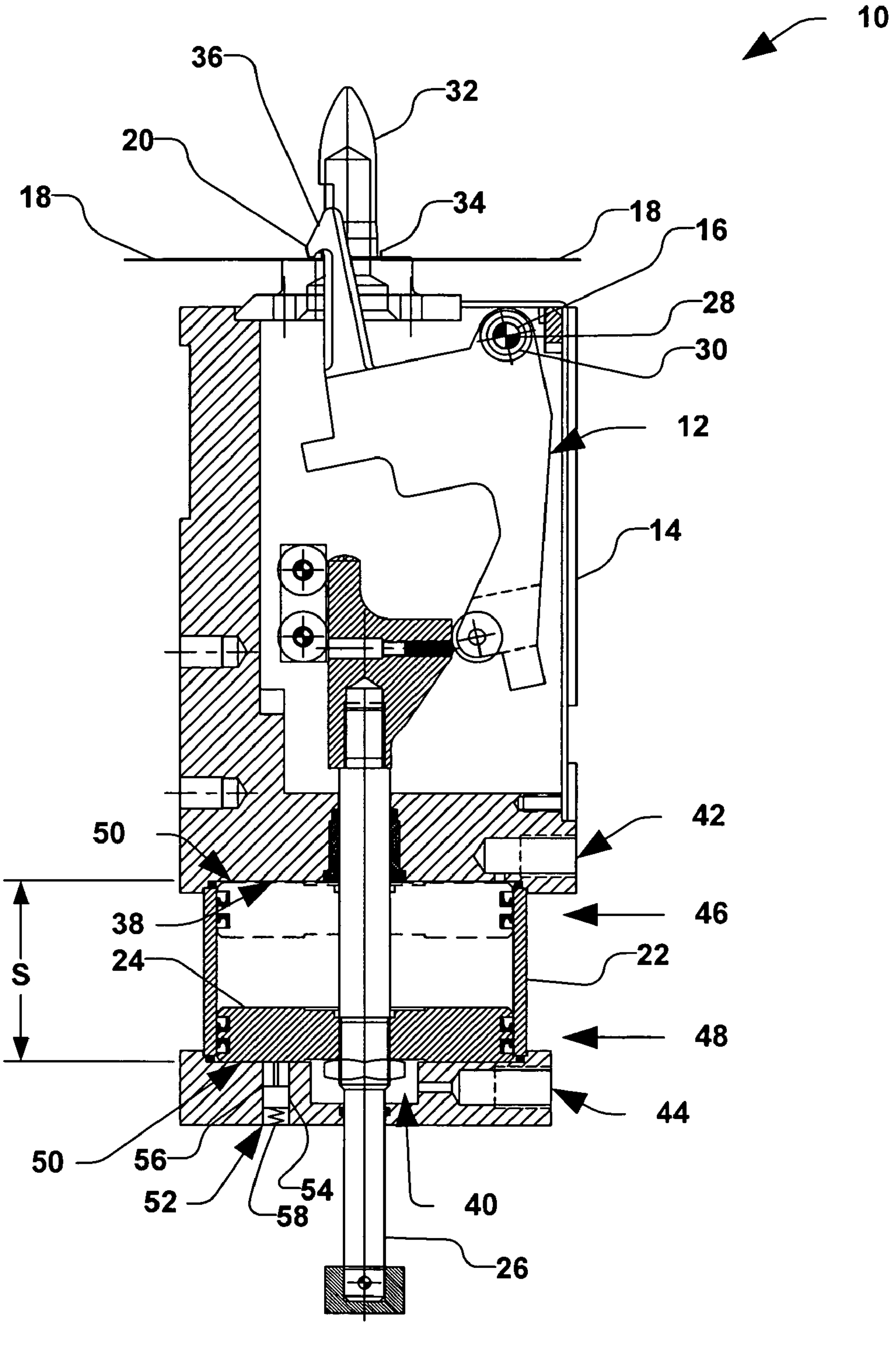
FIG. 1 (PRIOR ART)
FIG. 1 illustrates a cross-sectional view of an exemplary prior art pneumatic device.

The present invention will be described with reference to the drawings wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram form in order to facilitate description of the present invention.

The present invention is directed towards a fixture for positionally locating and clamping a workpiece to a surface. The fixture, for example, comprises a clamping arm operable to clamp the workpiece to the surface, wherein the clamping arm is easily removable from the fixture. Furthermore, the present invention is directed towards a cushioning apparatus, wherein the cushioning apparatus may be utilized in the locating and clamping fixture, and wherein the cushioning apparatus generally reduces a velocity of a piston translating within a cylinder associated with the fixture.

Figure 2:
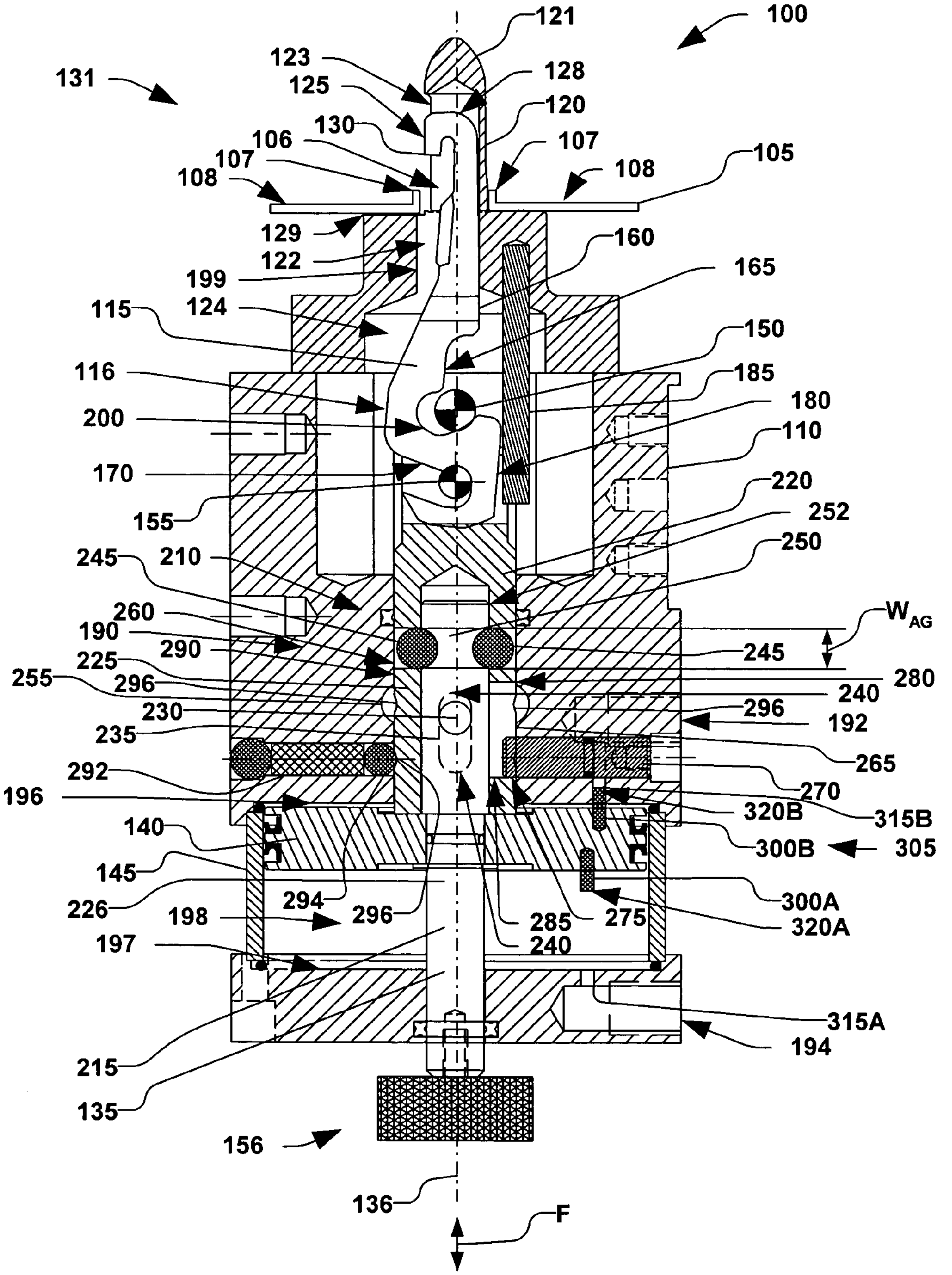
FIG. 2 illustrates a cross-sectional view of a locating and clamping fixture in a locating position according to one exemplary aspect of the present invention.

Referring now to the figures, FIG. 2 illustrates an exemplary locating and clamping fixture 100 according to one aspect of the present invention, wherein the locating and clamping fixture is operable to generally locate and clamp a workpiece 105 in a predetermined position. The fixture 100, for example, comprises a generally hollow body 110 and a clamping arm 115, wherein at least a portion 116 of the clamping arm is operable to rotate and translate within the body. A locating pin 120 is associated with the body, wherein the locating pin is operable to generally locate the workpiece 105 to a predetermined position when the workpiece is placed on the fixture 100. The locating pin 120, for example, is generally cylindrical and extends in an elongate manner outwardly from the body 110. The locating pin may still further be removably mounted to the body via one or more screws (not shown). The locating pin 120 is operable to generally locate the workpiece 105 with respect to the body 110, wherein the workpiece, for example, comprises a hole 106 therethrough, and wherein a placement of the workpiece onto the fixture 100 generally comprises placing the hole over the locating pin, therein passing the locating pin through the hole. The locating pin 120 may further comprise a tapered end 121, wherein the tapered end is operable to generally guide the workpiece 105 onto the locating pin.

According to another exemplary aspect of the invention, the locating pin 120 comprises a generally hollow portion 122 and an aperture 123 therethrough, wherein at least another portion 124 of the clamping arm 115 is operable to generally reside within the hollow portion. Alternatively, the locating pin 120 may comprise one or more guide members (not shown), wherein the one or more guide members are operable to generally locate the workpiece 105 with respect to the fixture 100.

In accordance with another aspect of the present invention, the locating pin 120 is operable to generally maintain a horizontal spatial position of the workpiece 105 with respect to the fixture 100. According to one exemplary aspect of the invention, the workpiece 105, may comprise a flange 107 associated with the hole 106, wherein the flange extends outwardly from a surface 108 of the workpiece by a predetermined amount (e.g., a flange extending about 2–3 mm vertically from the surface of the workpiece) around a diameter of the hole. Such flanges 107, for example, are commonly found in workpieces 105 such as automotive components, wherein the flange generally provides rigidity and/or additional structural integrity to the workpiece.

According to another exemplary aspect of the present invention, the clamping arm 115 is operable to secure the workpiece 105 relative to the fixture 100. The clamping arm 115, for example, comprises a gripping portion 125 at a distal end 128 thereof, wherein the clamping arm is operable to generally maintain a vertical spatial position of the workpiece 105 with respect to the fixture 100. The clamping arm 115 is generally operable to clamp the workpiece 105 between the gripping portion 125 and a base portion 129 of the fixture, wherein the base portion is associated with the one or more of the body 110 and the locating pin 120. According to one example, the base portion 129 is integral to the locating pin 120. According to another example, the base portion 129 is integral to the body 110. The gripping portion 125 of the clamping arm 115, for example, is generally U-shaped, wherein an end surface 130 of the gripping portion is operable to engage the surface 108 of the workpiece 105, and wherein the generally U-shaped gripping portion is operable to generally straddle the flange 107, thereby limiting contact between the clamping arm and the flange.

According to yet another example, the gripping portion 125 of the clamping arm 115 is operable to translate through the aperture 123 in the locating pin 120. The fixture 100 of FIG. 2 is illustrated in a locating position 131 (unclamped position), wherein the workpiece 105 can be generally located to and/or removed from the locating pin 120. While in the locating position 131, the gripping portion 125 of the clamping arm 115 generally resides within the hollow portion 122 of the locating pin 120, wherein the workpiece 105 can be placed over the locating pin without interference with the clamping arm.

According to another exemplary aspect of the present invention, the fixture 100 further comprises a drive pin 135, wherein the clamping arm 115 is generally coupled to the drive pin. The drive pin 135 is operably to linearly translate within the body 110 along a first axis 136, wherein the translation of the drive pin is associated with a predetermined movement of the clamping arm 115, as will be discussed infra. The drive pin 135, for example, is further operably coupled to a piston 140, wherein the piston is operable to linearly translate along the first axis 136 within a cylinder 145. According to one example, the cylinder 145 is separately mounted to the body 110, wherein the cylinder can be separated from the body by a removal of one or more fasteners (not shown). Alternatively, the cylinder 145 may be integral to the body 110 of the fixture 100, wherein a bore (not shown) within the body generally defines the cylinder.

The translation of the piston 140 within the cylinder 145, for example, is operable to provide a driving force F to the drive pin 135, wherein the driving force is operable to cause the drive pin to linearly translate along the first axis 136 within the body 110. As an alternative, the piston 140 and cylinder 145 may be replaced by a servo motor (not shown) or other electromechanical, pneumatic, or hydraulic mechanism which is operable to provide the driving force F to the drive pin 135. Accordingly, any mechanism operable to provide the driving force F to the drive pin 135 is contemplated as falling within the scope of the present invention.

Figure 4:
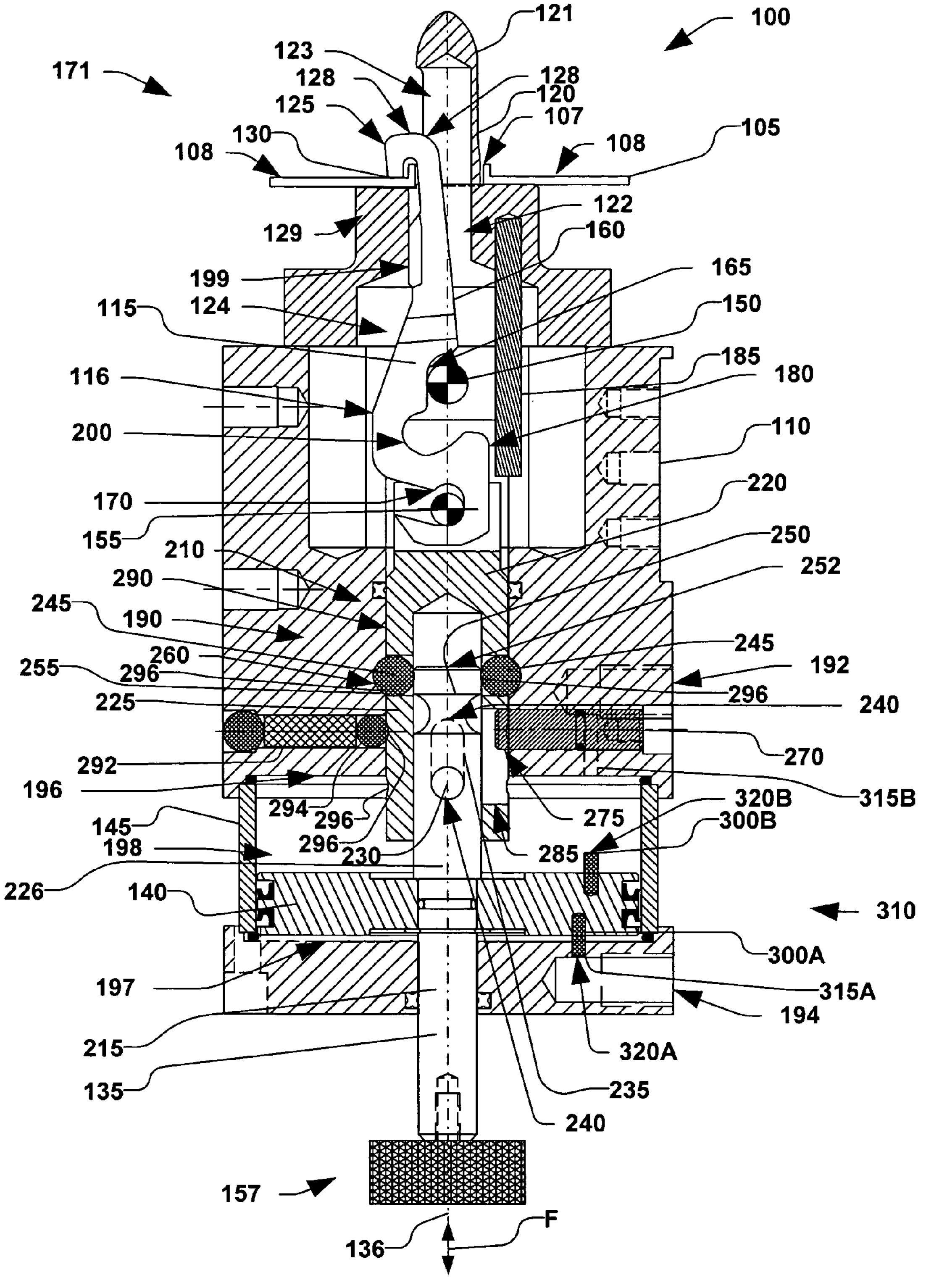
FIG. 4 illustrates a cross-sectional view of a locating and clamping fixture in a clamping position according to yet another exemplary aspect of the present invention.

According to another exemplary aspect of the invention, the fixture 100 further comprises a first cam follower 150 and a second cam follower 155, wherein the first cam follower is associated with the body 110, and wherein the second cam follower is associated with the drive pin 135. One or more of the first cam follower 150 and second cam follower 155, for example, may comprise a cylindrical pin or a roller bearing, wherein the first cam follower and the second cam follower are substantially resistant to frictional wear. The first cam follower 150, for example, is generally fixed with respect to the body 110, while the second cam follower 155 is generally fixed with respect to the drive pin 135. The second cam follower 155 is furthermore moveable with respect to the body 110 along the first axis 136 in conjunction with the translation of the drive pin 135. Still further, the drive pin 135, and hence the second cam follower 155, are moveable between an extended position 156 (e.g., as illustrated in FIG. 2) and a retracted position 157 (e.g., as illustrated in FIG. 4) along the first axis 136.

In accordance with yet another exemplary aspect of the present invention, the clamping arm 115 comprises a floating clamping arm 160, wherein the floating clamping arm is operable to be easily removed from the fixture 100. The floating clamping arm 160, for example, comprises a first cam surface 165 and a second cam surface 170, wherein the first cam follower 150 is operable to engage the first cam surface, and wherein the second cam follower 155 is operable to engage the second cam surface. The first cam surface 165 and the second cam surface 170, for example, are arranged such that upon the translational movement of the drive pin 135 (and hence, the translational movement of the second cam follower 155 with respect to the body 110), the floating clamping arm 160 is operable to linearly translate and rotate with respect to the body 110. The floating clamping arm 160 is, therefore, positionable within the body 110 via the translation of the drive pin 135 between the extended position 156 of FIG. 2 and the retracted position of FIG. 4. For example, the floating clamping arm 160 is operable to translate between an unclamped position (e.g., locating position 131 as illustrated in FIG. 2) when the drive pin 135 is in the extended position 156, and a clamped position 171 (e.g., as illustrated in FIG. 4) when the drive pin is in the retracted position 157.

The clamping arm 160, for example, is not rigidly fixed to either of the first cam follower 150 or the second cam follower 155, wherein the first cam surface 165 and the second cam surface 170 are operable to both linearly translate and to rotate with respect to each of the first cam follower and the second cam follower. Therefore, floating clamping arm 160, for example, may be manually maneuvered between the first cam follower 150 and the second cam follower 155 in the absence of the driving force F. Furthermore, the floating clamping arm 160 can be easily removed from the body 110, as will be described infra.

Figure 3:
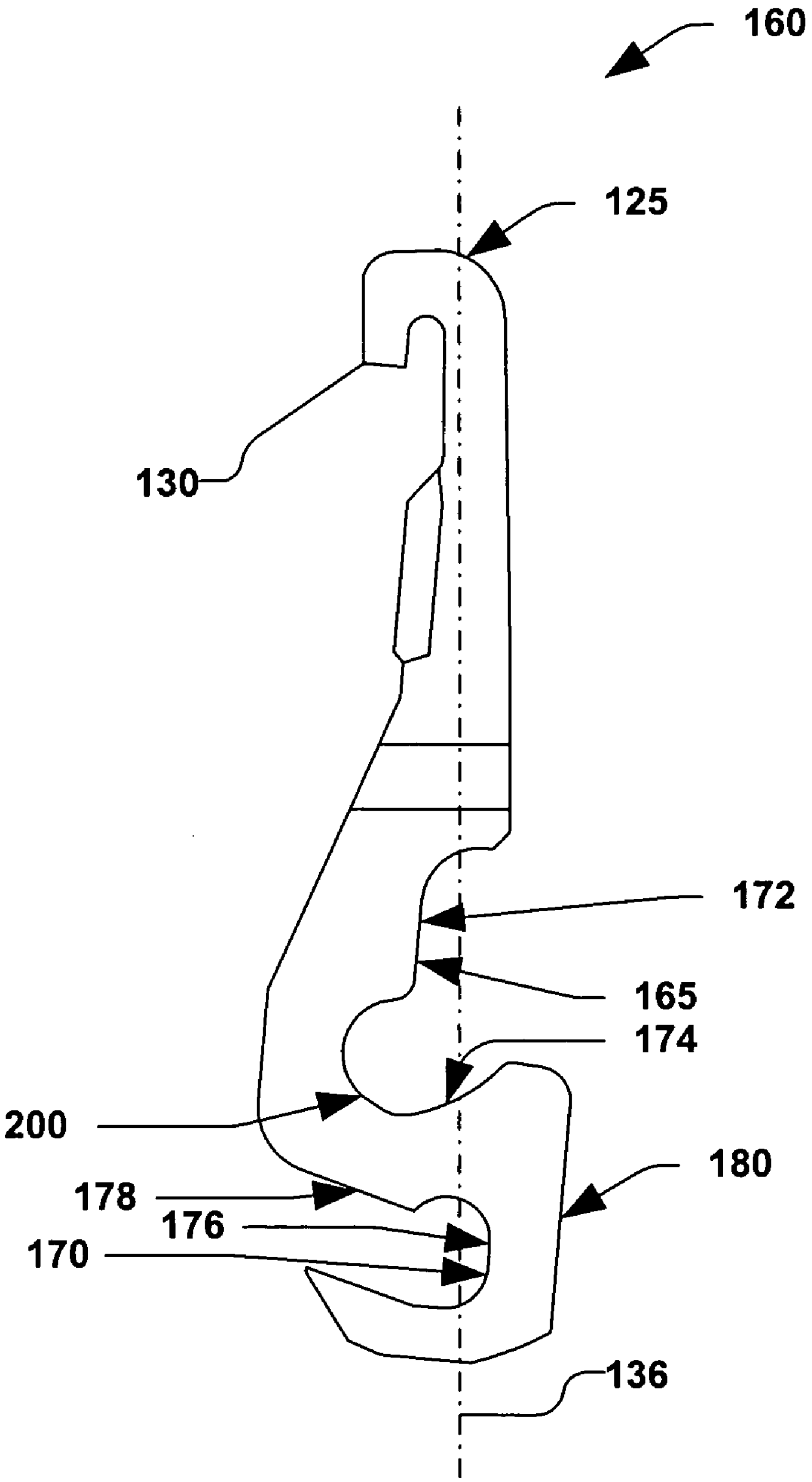
FIG. 3 illustrates a plan view of an clamping arm according to another exemplary aspect of the present invention.

FIG. 3 illustrates the exemplary floating clamping arm 160, wherein the floating clamping arm comprises the first cam surface 165, the second cam surface 170, and the gripping portion 125. One or more of the first cam surface 165 and the second cam surface 170, for example, are curvilinear in shape, wherein a configuration of the first cam surface and the second cam surface generally defines the predetermined movement of the floating clamping arm 160 with respect to the body 110 of FIG. 2. According to yet another exemplary aspect of the present invention, the first cam surface 165 and the second cam surface 170 have a generally open looped configuration, wherein the respective first cam follower 150 and second cam follower 155 are operable to engage and disengage the respective first cam surface and second cam surface by the rotation and translation of the floating clamping arm 160. Such an open looped configuration is advantageous over conventional clamping arms in that the floating clamping arm 160 of the present invention can be removed from the body 110 without a removal of the first cam follower 150 or the second cam follower 155 from the body.

Referring again to FIG. 3, the first cam surface 165, for example, comprises a first portion 172 which is generally parallel to the first axis 136 and a second portion 174 which is offset at a first angle from the first axis when the clamping arm 160 is viewed in the locating position 131, as illustrated in FIG. 2. Furthermore, the second cam surface 170 comprises a third portion 176 which is generally parallel to the first axis 136 and a fourth portion 178 which is offset at a second angle from the first axis when the floating clamping arm 160 is viewed in the retracted position illustrated in FIG. 2. According to one example, the first angle is offset from the first axis 136 by greater than approximately 90 degrees, and the second angle is offset from the first axis by less than approximately 90 degrees. According to another example, the clamping arm comprises a sliding surface 180, wherein the sliding surface is associated with a first dowel pin 185, as illustrated again in FIG. 2.

The first dowel pin 185, for example, is associated with the locating pin 120, wherein the first dowel pin is operable to generally limit the rotation of the floating clamping arm 160 with respect to the body. In accordance with one example, the first dowel pin 185 extends downward into the generally hollow body 110 from the locating pin 120, wherein the first dowel pin is generally fixed with respect to the locating pin. The first dowel pin 185, for example, is operable to generally limit the rotation of the floating clamping arm 160 within the body 110, wherein the sliding surface 180 associated with the floating clamping arm is operable to slidingly contact the first dowel pin, thus limiting the rotation of the floating clamping arm, yet allowing the floating clamping arm to generally translate along, or parallel to, the first axis 136.

According to still another exemplary aspect of the present invention, the fixture 100 further comprises an anti-rotation mechanism 190 operatively associated with the drive pin 135. The anti-rotation mechanism 190 generally limits a rotation of the drive pin 135 with respect to the body 110. According to one example, the piston 140 and cylinder 145 are generally ovular when viewed perpendicular to the first axis 136, wherein the generally ovular piston and cylinder generally define the anti-rotation mechanism 190. Another exemplary anti-rotation mechanism 190 comprises one or more splines (not shown) associated with the drive pin 135 and the body 110, wherein the one or more splines generally engage one another to generally permit a translation of the drive pin with respect to the body along the first axis 136, while generally limiting a rotation of the drive pin with respect to the body about the first axis. Other anti-rotation mechanisms 190 such as pins (not shown) and corresponding slots (not shown) or any other device which generally limits the rotation of the drive pin 135 with respect to the body 110 are furthermore contemplated, and fall within the scope of the present invention.

According to another exemplary aspect of the present invention, the fixture 100 comprises a first port 192 and a second port 194 associated with a respective first end 196 and second end 197 of the cylinder 145. The first port 192 and the second port 194 are operable to generally permit a selective flow of compressed gas (not shown) from a compressed gas source (not shown) therethrough. The first port 192 and the second port 194, for example, are furthermore operable to selectively vent compressed gas from the cylinder 145. The selective flow of compressed gas through one of the first port 192 or the second port 194 to an interior portion 198 of the cylinder 145, for example, is operable to selectively translate the piston 140 within the cylinder, depending on which of the first port or the second port receives the compressed gas and which of the first port or the second port vents the compressed gas to atmosphere. Upon receiving the flow of compressed gas to the first port 192 or the second port 194, the respective first end 196 or second end 197 of the cylinder 145 becomes pressurized, and the other one of first port or the second port is operable to vent the compressed gas to atmosphere from the respective first end or second end of the cylinder, thereby causing the translation of the piston 140 along the first axis 136 due to a differential in pressure.

In accordance with another exemplary aspect of the present invention, FIGS. 5A–5F illustrate the floating clamping arm 160 in a plurality of positions, wherein the floating clamping arm rotates and translates with respect to the body 110. Beginning with FIG. 5A, the floating clamping arm 160 is in the unclamped (locating) position 131, wherein the workpiece 105 can be placed over the locating pin 120, such that the locating pin protrudes through the hole 106 in the workpiece. In the locating position 131 (e.g., as further illustrated in FIG. 2), the gripping portion 125 of the floating clamping arm 160 generally resides within the hollow portion 122 of the locating pin 120, wherein the clamping arm does not interfere with the placement of the workpiece 105 over the locating pin.

Figure 5C:
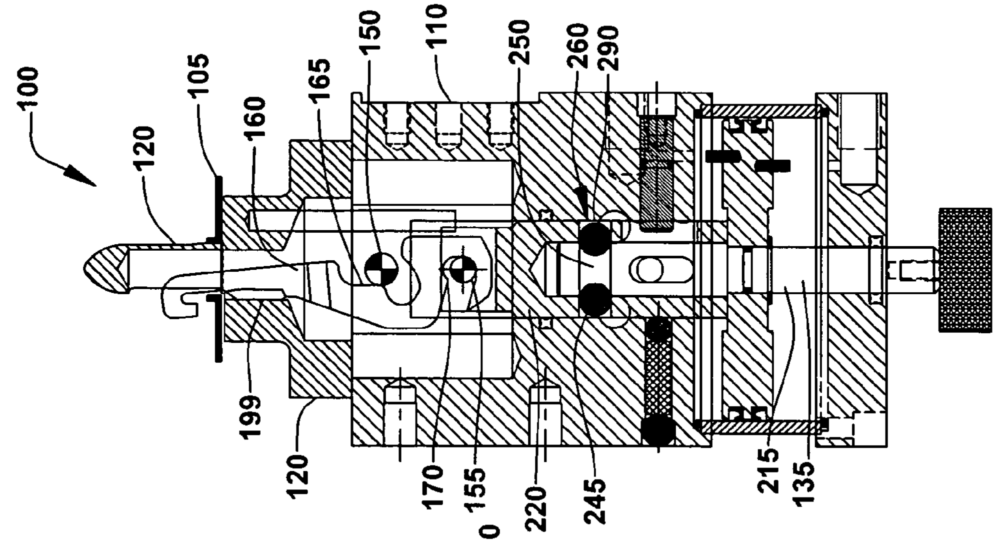
FIGS. 5A–5F illustrate a locating and clamping fixture in various positions between and including the locating position of FIG. 2 and the clamping position of FIG. 4 according to still another exemplary aspect of the present invention.
Figure 5B:
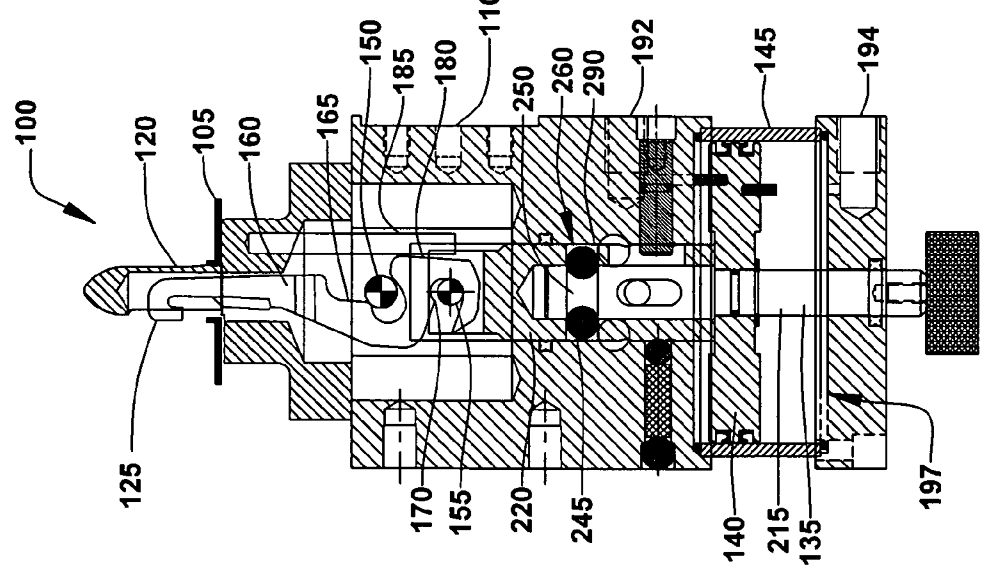
Figure 5A:
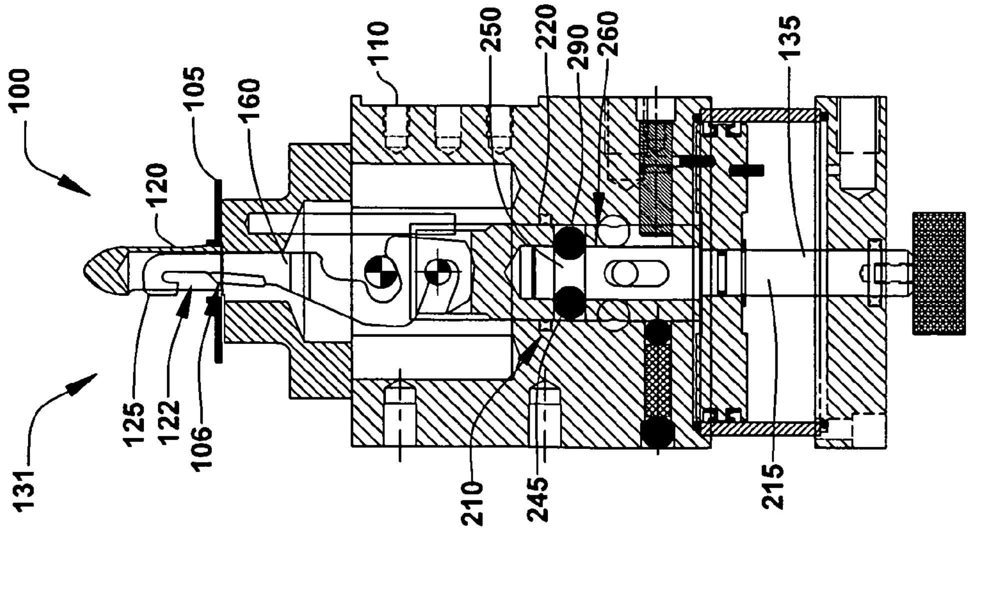

FIG. 5B illustrates a first intermediate position of the clamping arm 160 (e.g., when the compressed gas is introduced to the first port 192 and vented to atmosphere through the second port 194, thereby causing the piston 140 and drive pin 135 to translate downwards toward the second end 197 of the cylinder 145). In the first intermediate position, the floating clamping arm 160 generally begins to rotate and translate with respect to the body 110. The first cam follower 150 and second cam follower 155 generally slidingly engage the first cam surface 165 and second cam surface 170, respectively, wherein the first dowel pin 185 generally limits the rotation of the floating clamping arm 160 by slidingly contacting the sliding surface 180 of the floating clamping arm. At the first intermediate position in FIG. 5B, the gripping portion 125 of the floating clamping arm 160 generally begins to extend through the aperture 123 in the locating pin 120.

FIG. 5C illustrates a second intermediate position of the floating clamping arm 160, wherein the first cam follower 150 continues to follow the first cam surface 165, and a first sidewall 199 further generally limits the rotation of the clamping arm. The first sidewall 199, for example, is associated with one or more of the hollow body 110 and the locating pin 120. The clamping arm 160 slidingly engages the first sidewall 199 in the movements illustrated in FIGS. 5C through 5F, wherein the first cam follower 150 generally follows the first cam surface 165, and the second cam follower 155 generally remains stationary with respect to the second cam surface 170, until the clamping arm 160 is in the clamped position 171 illustrated in FIGS. 4 and 5F. Note that the gripping portion 125 of the clamping arm 160, for example, contacts the workpiece 105 at the end surface 130 of the gripping portion, and does not contact the flange 107 of the workpiece due to the generally U-shaped gripping portion of the clamping arm. It should also be noted that the floating clamping arm 160 can also adapt to varying workpiece thicknesses (not shown) due to the relationship of the first cam follower 150 with first cam surface 165 and the second cam follower 155 with the second cam surface 170.

In accordance with another exemplary aspect of the present invention, the floating clamping arm 160 can be easily removed from the fixture 110 without removing the first cam follower 150 or the second cam follower 155 from the body 110. For example, referring again to FIG. 3, the floating clamping arm 160 further comprises a third cam surface 200, wherein the first cam follower 150 is further operable to selectively engage the third cam surface. Upon engagement of the third cam surface 200 by the first cam follower 150, the clamping arm 160 can be manually rotated and translated, such that the second cam surface 170 is operable to be disengaged from the second cam follower 155.

FIGS. 6A–6E illustrate an exemplary removal of the floating clamping arm 160 from the body 110 of the fixture 100. Beginning with FIG. 6A, the locating pin 120 and first dowel pin 185 are removed from the body. The first dowel pin 185, in the present example, is integral to the locating pin 120, wherein the removal of the locating pin incorporates a removal of the first dowel pin from the body 110. With the removal of the locating pin 120 and first dowel pin 185 from the body, the sliding surface 180 of the floating clamping arm generally no longer limits the rotation of the clamping arm 160 within the body 110.

Figure 6A:
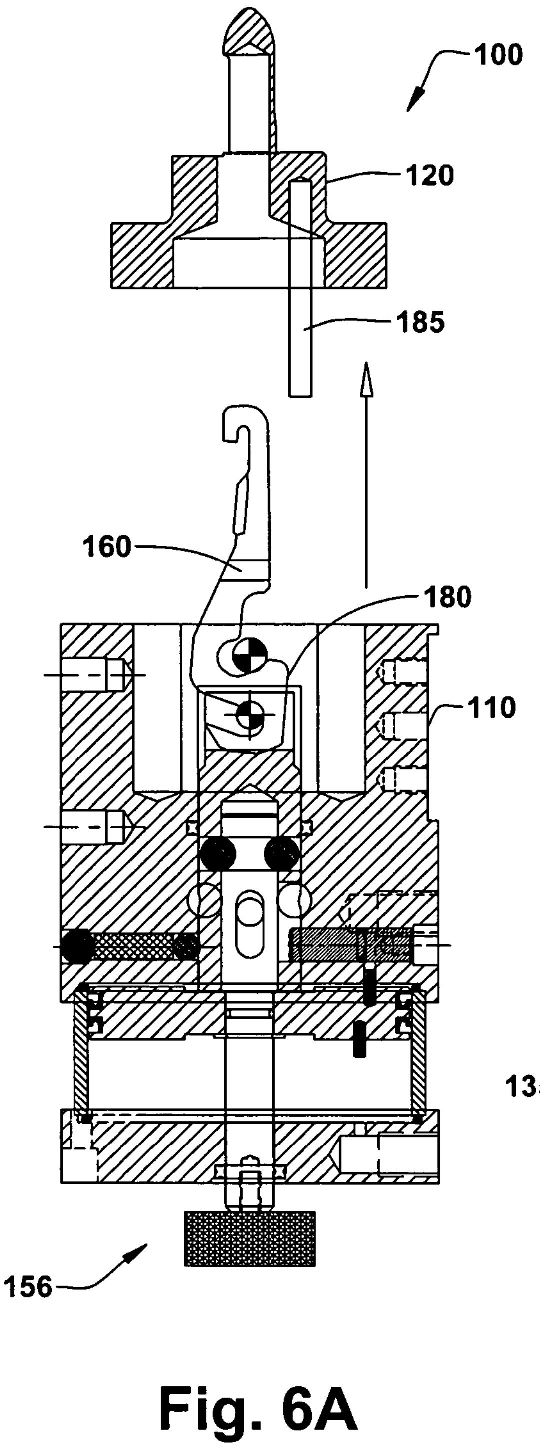
FIGS. 6A–6E illustrates a removal of a floating clamping arm from a locating and clamping fixture according to another aspect of the present invention.
Figure 6B:
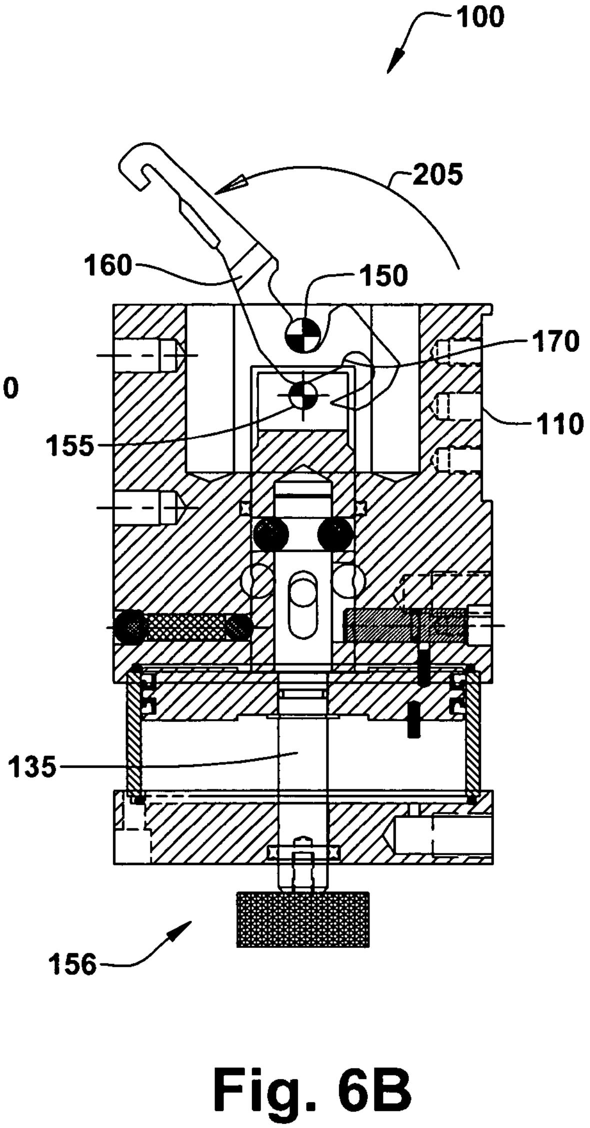
Figure 6E:
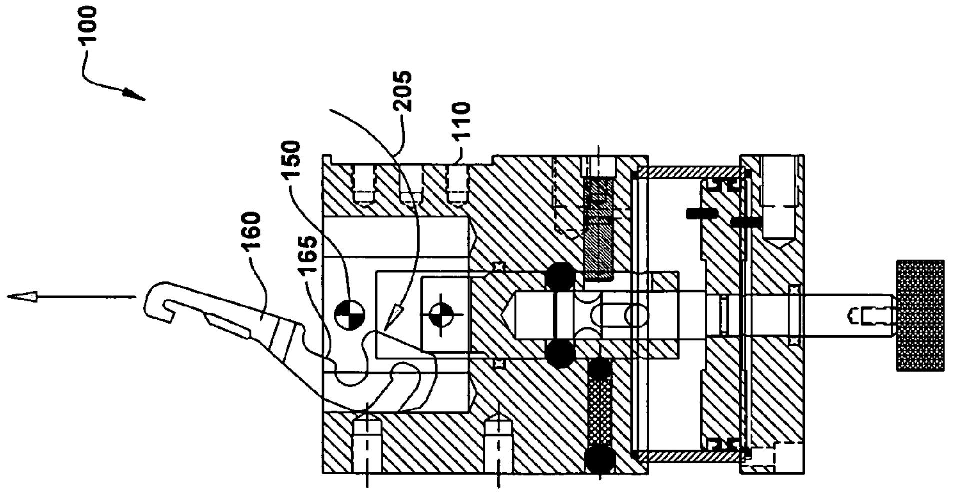
Figure 6D:
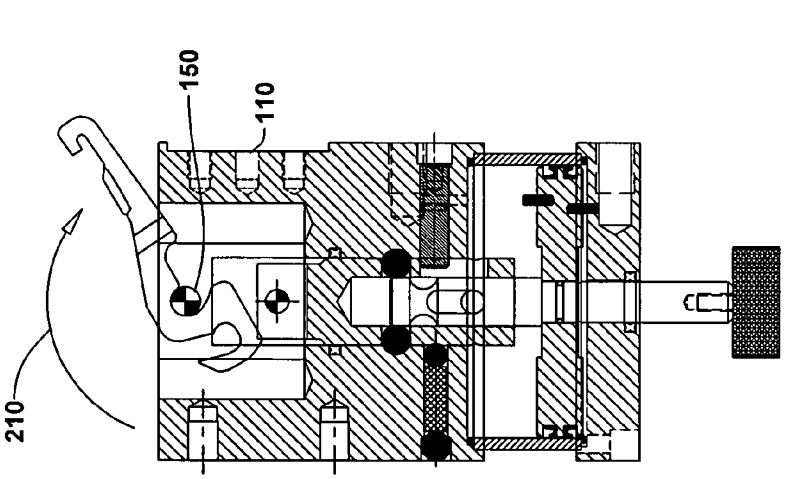
Figure 6C:
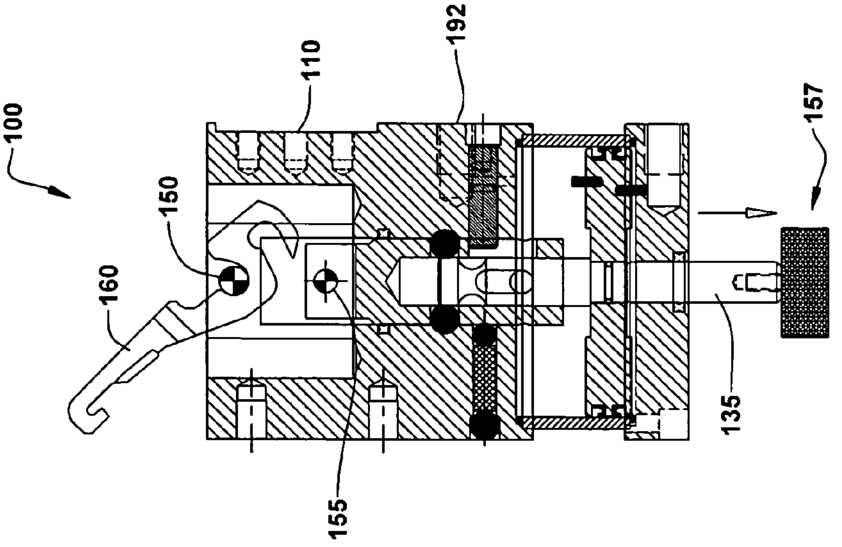

FIG. 6B illustrates a manual rotation of the floating clamping arm 160, wherein the second cam surface 170 and second cam follower 155 are generally disengaged from one another by the rotation of the clamping arm about the first cam follower 150 in a first direction 205 (e.g., a counter-clockwise rotation) when the drive pin 135 is in the extended position 156. In FIG. 6C, the drive pin 135 is moved to the retracted position 157 (e.g., either manually or by compressed gas applied to the first port 192), wherein the second cam follower 155 is generally translated away from the first cam follower 150 (e.g., downwardly along the first axis 136). In FIG. 6D, the floating clamping arm 160 is rotated in a second direction 210 (e.g., clockwise) about the first cam follower 150, wherein the second direction is opposite the first direction 205 of FIG. 6B. In FIG. 6E, the first cam surface 165 and first cam follower 150 are generally disengaged from one another by a lateral translation of the clamping arm 160 (e.g., generally perpendicular to the first axis 136). The lateral translation of the floating clamping arm 160 illustrated in FIG. 6E may also include a rotation of the clamping arm in the first direction 205. The floating clamping arm 160 can then be removed from the body 110 via a translation of the clamping arm which is generally parallel to the first axis 136. In order to reinstall of the floating clamping arm 160 into the body 110, the steps of FIGS. 6A–6E, for example, are generally reversed.

It should also be noted that the floating clamping arm 160 of the present invention may be associated with a fixture 100 which does not comprise the locating pin 120 as mentioned above. For instance, the gripping portion 125 of the floating clamping arm 160 can extend outwardly from the body 110, wherein the workpiece 105 can be generally clamped between the gripping portion 125 of the clamping arm 160 and the body 110, and wherein the first sidewall 199 is associated with the body. Furthermore, the first dowel pin 185 can be associated with the body 110 (e.g., a removable pin or block removably attached to the body), rather than being associated with the locating pin assembly 120.

In accordance with still another exemplary aspect of the present invention, as illustrated in FIG. 2, the locating and clamping fixture 100 further comprises a locking mechanism 210 associated with the drive pin 135. The locking mechanism 210 is operable to generally maintain a position of the clamping arm 115 (e.g., the floating clamping arm 160) with respect to the body 110 in the event of a loss of the driving force F (e.g., a loss of compressed gas pressure to the first port 192).

The locking mechanism 210, for example, comprises the drive pin 135 being separated into two segments; namely, a driver portion 215 coupled to the piston 140 and a driven portion 220 coupled to the clamping arm 115. The driven portion 220, for example, comprises a generally hollow outer shaft 225, and the driver portion 215 comprises a generally solid inner shaft 226, wherein the driver portion 215 is operable to translate within the driven portion 220 along the first axis 136. The driver portion 215 and the driven portion 220 of the drive pin 135, for example, are operably coupled to one another by a second dowel pin 230 associated with the driver portion, and a first slot 235 associated with the driven portion, wherein the second dowel pin is operable to translate along the first axis 136 between extents 240 associated with the first slot 235. The first slot 235 and second dowel pin 230, for example, are operable to provide a “rap” feature, where the driver portion 215 is operable to translate while the driven portion 220 remains generally stationary, and wherein the driver portion is operable to gain momentum prior to reaching one of the extents 240 of the first slot 235. A gain in momentum prior to engaging the driven portion 220 is advantageous in that inertial forces associated with the clamping arm 115 or other components can be overcome by the momentum gained in the driver portion 220.

The locking mechanism 210 may further comprise one or more rollers 245, wherein the one or more rollers are operable to maintain a position of the clamping arm 115 in a case where the driving force F is lost. For example, the driver portion 215 of the drive pin 135 comprises an annular groove 250 at a one end 252 thereof, wherein a radius RAG of the annular groove is associated with a radius $R_R$ of the one or more rollers 245, and a width WAG of the annular groove is slightly less than twice the radius $R_R$ of the one or more rollers. Furthermore, the body 110 comprises one or more lateral grooves 255 perpendicular to the first axis 136 and offset a predetermined amount from the first axis, wherein a radius $R_{LG}$ of the one or more lateral grooves is further associated with the radius $R_R$ of the one or more rollers 245, and a width $W_{LG}$ of the lateral groove is slightly less than twice the radius $R_R$ of the one or more rollers.

Still further, the driven portion 220 of the drive pin 135 further comprises one or more channels 260 therein, wherein the one or more channels are associated with the respective one or more rollers 245. Each of the one or more channels 260 has a generally rectangular cross section when viewed perpendicularly to the first axis 136, wherein a width $W_C$ of the one or more channels is slightly more than twice the radius $R_R$ of the one or more rollers 245. The one or more channels 260, for example, are generally eccentric to the driven portion 220 of the drive pin 135 and are generally parallel to one or more rollers 245.

The one or more rollers 245 are furthermore associated with the annular groove 250, the one or more lateral grooves 255, and the one or more channels 260, wherein, depending upon a position of the driven portion 220 with respect to the body 110 along the first axis 136, the one or more rollers 245 may reside within one or more of the annular groove 250, the one or more lateral grooves 255, and the one or more channels 260. The locking mechanism 210, for example, still further comprises the driven portion 220 of the drive pin 135 having a second slot 265 therein, wherein the second slot is generally parallel with the first axis 136 and radially offset from the first slot 235 by a predetermined amount (e.g., approximately 90 degrees about the first axis). Accordingly, the locking mechanism 210 yet further comprises a third dowel pin 270 associated with the body 110, wherein an end portion 275 of the third dowel pin is operable to reside within the second slot 265. The third dowel pin 270, for example, generally permits the driven portion 220 of the drive pin 135 to translate between a first extent 280 and a second extent 285 of the second slot 265.

Figure 5D:
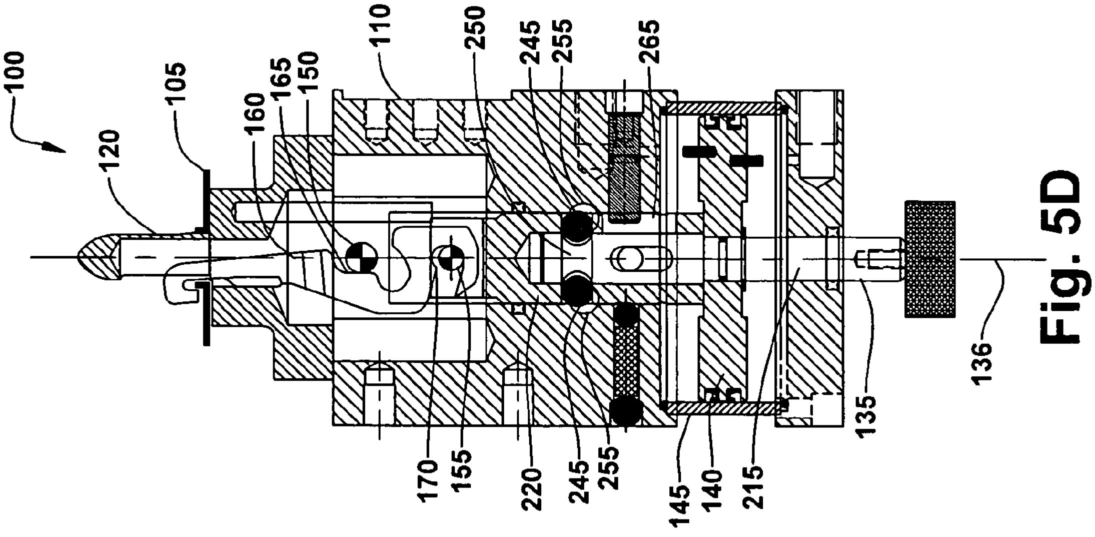

In operation, the locking mechanism 210, for example, is operable to generally maintain the position of the clamping arm when the driving force F is lost by an interface between the one or more rollers 245, the drive pin 135, and the one or more lateral grooves 255. FIGS. 5A–5F further illustrate an exemplary operation of the locking mechanism 210, wherein the driver portion 215 generally translates the one or more rollers 245 with respect to the body 110. For example, in FIGS. 5A–5C, the driver portion 215 and the driven portion 220 of the drive pin 135 are generally coupled by the one or more rollers 245 interfacing between the annular groove 250, the one or more channels 260, and a second sidewall 290 of the body 110. During the translation of the drive pin 135 between FIGS. 5A–5C, the driver portion 215 and the driven portion 220 generally translate in unison. In FIG. 5D, the driver 215 begins to generally translate the one or more rollers 245 radially with respect to the first axis 136, wherein the one or more rollers begin to translate out of the annular groove 250 and into the one or more lateral grooves 255.

Figure 5E:
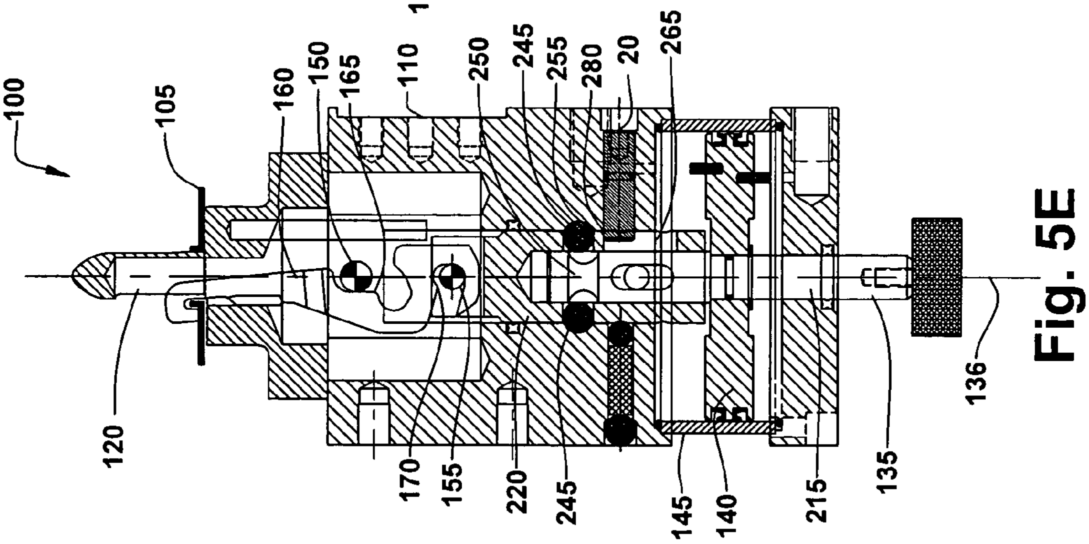
Figure 5F:
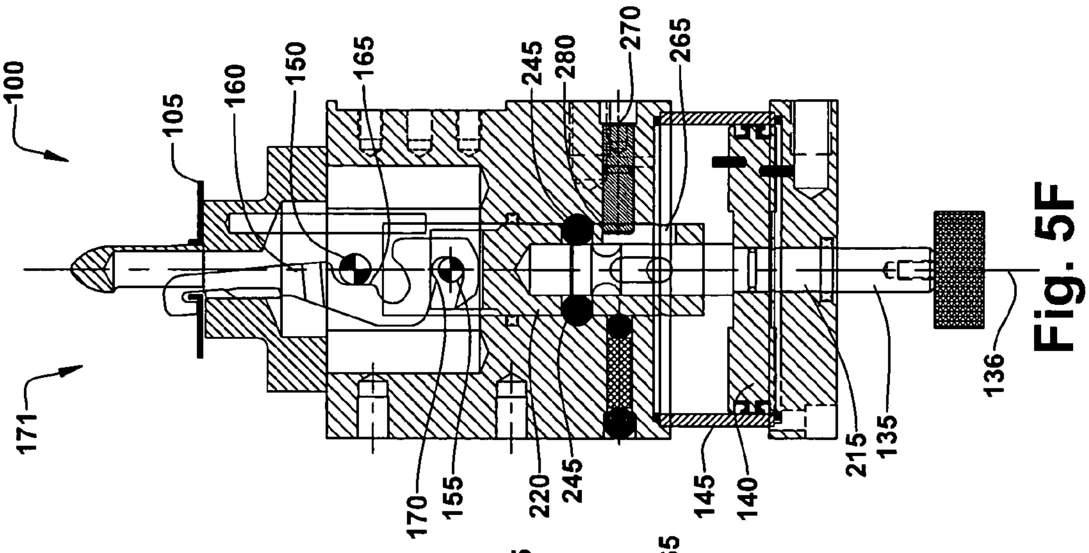

During the translation illustrated in FIGS. 5D–5F, the driver portion 215 translates with respect to the driven portion 220, wherein the first extent 280 of the second slot 265 generally causes the annular groove 250 to force the one or more rollers into the one or more lateral grooves 255 until the one or more rollers until no longer reside within the annular groove 250. FIG. 5F illustrates a locked position of the drive pin 135, wherein an outer diameter D of the driver portion 215 generally maintains the one or more rollers 245 within the one or more lateral grooves 255 and the one or more channels 260. In the locked position, the driven portion 220, and hence the floating clamping arm 160, are generally not permitted to move upon a removal of the driving force F (e.g., a loss of pressure to the first port 192) due to the one or more rollers 245 being within the one or more lateral grooves by the outer diameter D of the driver portion 215.

According to another exemplary aspect of the present invention, the locking mechanism 210 further comprises a resilient member 292, a ball 294, and one or more secondary grooves 296 associated with the driven member 220. The resilient member 292 (e.g., a resilient polyurethane cylinder or a spring) and the ball 294 generally reside within a cylindrical bore 297 in the body 110, wherein the ball is operable to selectively engage the one or more secondary grooves, depending on the position of the driven portion 220. For example, the driven portion comprises secondary grooves 296A and 296B associated with the extended position and the retracted position of the drive pin 135, respectively. The ball 294 is operable to engage secondary groove 296A when the drive pin 135 (and hence, the driven portion 220) is in the extended position, and is further operable to engage secondary groove 296B when the drive pin is in the retracted position. The ball 294 engaging the one or more secondary grooves 296 generally provides a limited force for maintaining the position of the driven portion 220 with respect to the body.

According to yet another exemplary aspect of the present invention, one or more cushioning pins 300 are associated with the piston 140, wherein the one or more cushioning pins are operable to generally reduce a velocity of the piston with respect to the cylinder 145. The one or more cushioning pins 300, for example, are generally rigidly mounted to the piston 140, wherein the one or more cushioning pins are operable to translate with the piston 140 with respect to the cylinder 145. Each of the one or more cushioning pins is operable to linearly translate between an associated first position 305 (e.g., the extended position illustrated in FIG. 2) and a second position 310 (e.g., the extended position of FIG. 4) within the cylinder 145. Each of the one or more cushioning pins 300, for example, are furthermore associated with one or more cushioning holes 315, wherein the one or more cushioning pins are operable to translate into and out of the respective one or more cushioning holes, wherein a diameter of the one or more cushioning holes 315 is larger than a diameter of the one or more cushioning pins 300. For example, the one or more cushioning holes 315 are approximately 0.06 millimeters larger than a diameter of the one or more cushioning pins 300. Furthermore, each of the one or more cushioning holes is associated with one or more of the first port 192 and the second port 194, wherein the respective cushioning hole generally permits a fluid communication between the respective first port 192 and second port 194 and an interior portion 320 of the cylinder 145.

As illustrated in FIG. 2, in the first position 305, for example, the cushioning pin 300A resides outside of the associated cushioning hole 315A, wherein the compressed gas (not shown) is not impeded from flowing from between the interior portion 198 (e.g., the second end 197 of the cylinder 145) through the cushioning hole and the second port 194. The cushioning pin 300B in FIG. 2, for example, generally resides within the cushioning hole 315B in the first position 305, wherein fluid communication between the interior portion (e.g., the first end 196) of the cylinder 145 is significantly impeded.

An application of compressed gas to the first port 192 while venting the second port 194 to atmosphere, for example, will create a compressive force on the cushioning pin 315B and the piston 140, wherein the piston is generally forced downward by the compressed gas, thereby forcing the cushioning pin 300B from the cushioning hole 315B. Upon the application of the compressed gas to first port 192 (with second port 194 vented to atmosphere), the piston 140 is generally forced to the second position 310, as illustrated in FIG. 4, wherein the cushioning pin 300A is generally forced into the cushioning hole 315A. When the cushioning pins 300 no longer reside in the respective cushioning holes 315, the translation of the piston 140 with respect to the cylinder 145 occurs at a rate which is generally proportional to the pressure of the compressed gas.

During a transition between the first position 305 of FIG. 2 and the second position 310 of FIG. 4, wherein one of the cushioning pins 300 begins to enter one of the cushioning holes 315, the cushioning pin 300 entering the cushioning hole 315 generally acts as a needle valve, wherein a flow of the compressed gas through the respective cushioning hole is generally limited by the interference of the cushioning pin with a flow path of the compressed gas. For example, when an end 320A of the cushioning pin 300A begins to enter the cushioning hole 315A, the flow of compressed gas through the cushioning hole is dramatically decreased, thereby slowing the translation of the piston 140 within the cylinder 145 until the piston reaches the second end 197 of the cylinder. Similarly, cushioning pin 300B is operable to act in a similar fashion with respect to cushioning hole 315B when compressed gas is applied to the second port 194 and the first port 192 is vented to atmosphere, wherein the translation of the piston 140 is slowed when the end 320B of the cushioning pin 300B enters the cushioning hole 315B, until the piston reaches the first end 196 of the cylinder 145. Such a slowing of the translation of the piston 140 is advantageous in both limiting inertial impact forces applied to the first end 196 and second end 198 of the cylinder 145 (e.g., thereby increasing a mean time before failure of the device), as well as, for example, limiting inertial impact forces applied to the workpiece 105.

Although the invention has been shown and described with respect to certain aspects, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary aspects of the invention. In addition, while a particular feature of the invention may have been disclosed with respect to only one of several aspects, such feature may be combined with one or more other features of the other aspects as may be desired and advantageous for any given or particular application. Furthermore, to the extent that the term "includes" is used in either the detailed description and the claims, such term is intended to be inclusive in a manner similar to the term "comprising."

What is claimed is:

1. A locating and clamping fixture for locating and clamping a workpiece, the fixture comprising:

a generally hollow body;

a first cam follower located within the body;

a drive pin having a first axis associated therewith, wherein the drive pin is moveable within the body along the first axis, and wherein the drive pin further comprises a second cam follower; and a floating clamping arm comprising a first cam surface, a second cam surface, and a gripping portion, wherein the first cam surface and the second cam surface have a generally open looped configuration and are operable to engage and disengage the respective first cam follower and the second cam follower, and wherein upon an application of a driving force by the drive pin, the clamping arm is operable to rotate and linearly translate with respect to the body via a translational movement of the drive pin along the axis, wherein the gripping portion of the clamping arm is operable to extend over the workpiece and to clamp the workpiece to the body.

2. The locating and clamping fixture of claim 1, wherein the first cam follower is generally rigidly attached to the body.

3. The locating and clamping fixture of claim 1, wherein one or more of the first cam follower and second cam follower comprise a dowel pin or a roller bearing.

4. The locating and clamping fixture of claim 1, wherein one or more of the first cam surface and the second cam surface are curvilinear.

5. A locating and clamping fixture for locating and clamping a workpiece, the fixture comprising:

a generally hollow body;

a first cam follower located within the body;

a drive pin having a first axis associated therewith, wherein the drive pin is moveable within the body along the first axis, and wherein the drive pin further comprises a second cam follower; and a floating clamping arm comprising a first cam surface, a second cam surface, and a gripping portion, wherein the first cam surface and the second cam surface are operable to respectively engage the first cam follower and the second cam follower, and wherein upon an application of a driving force by the drive pin, the clamping arm is operable to rotate and linearly translate with respect to the body via a translational movement of the drive pin along the axis, wherein the gripping portion of the clamping arm is operable to extend over the workpiece and to clamp the workpiece to the body, and wherein the clamping arm further comprises a third cam surface, wherein the first cam follower is further operable to engage the third cam surface, and whereupon the engagement of the third cam surface by the first cam follower, the second cam surface is operable to be disengaged from the second cam follower.

6. The locating and clamping fixture of claim 1, further comprising a locating pin mounted to the body, wherein the locating pin is operable to generally locate a position of the workpiece with respect to the body.

7. The locating and clamping fixture of claim 6, wherein the locating pin comprises a generally hollow portion and an aperture therethrough, wherein a portion of the clamping arm is operable to reside within the hollow portion, and wherein the gripping portion of the clamping arm is operable to extend through the aperture.

8. The locating and clamping fixture of claim 1, wherein the gripping portion of the clamping arm is generally U-shaped, wherein an end of the gripping portion is operable to engage the workpiece.

9. The locating and clamping fixture of claim 1, further comprising an anti-rotation mechanism operatively associated with the drive pin, wherein a rotation of the drive pin about the axis is generally limited.

10. The locating and clamping fixture of claim 9, wherein the anti-rotation mechanism comprises one or more splines associated with the drive pin and the body.

11. The locating and clamping fixture of claim 9, further comprising a cylinder and a piston, wherein the piston is operably coupled to the drive pin, wherein the piston is operable to linearly translate within the cylinder, therein providing the driving force, and wherein the piston and cylinder are generally ovular in cross-section, as viewed perpendicularly from the axis of the drive pin, thereby limiting the rotation of the drive pin with respect to the body.

12. The locating and clamping fixture of claim 11, wherein the body further comprises a first port and a second port, wherein the first port and the second port are associated with a first end and a second end of the cylinder, wherein the first port and second port are operable to receive a compressed gas, and wherein the compressed gas is operable to selectively translate the piston within the cylinder, therein providing the driving force to the drive pin.

13. The locating and clamping fixture of claim 1, further comprising a cylinder and a piston, wherein the piston is operably coupled to the drive pin, and wherein the piston is operable to linearly translate within the cylinder, therein providing the driving force.

14. The locating and clamping fixture of claim 1, further comprising a locking mechanism associated with the drive pin, wherein upon loss of the driving force, the locking mechanism is operable to maintain a position of the clamping arm with respect to the body.

15. A locating and clamping fixture for locating and clamping a workpiece, the fixture comprising:

a generally hollow body;

a first cam follower located within the body;

a drive pin having a first axis associated therewith, wherein the drive pin is moveable within the body along the first axis, and wherein the drive pin further comprises a second cam follower;

a floating clamping arm comprising a first cam surface, a second cam surface, and a gripping portion, wherein the first cam surface and the second cam surface are operable to respectively engage the first cam follower and the second cam follower, and wherein upon an application of a driving force by the drive pin, the clamping arm is operable to rotate and linearly translate with respect to the body via a translational movement of the drive pin along the axis, wherein the gripping portion of the clamping arm is operable to extend over the workpiece and to clamp the workpiece to the body; and a locking mechanism associated with the drive pin, wherein upon loss of the driving force, the locking mechanism is operable to maintain a position of the clamping arm with respect to the body, wherein the locking mechanism comprises:

one or more lateral grooves associated with the body;

one or more rollers associated with the one or more lateral grooves;

an inner shaft and an outer shaft operably coupled with the drive pin, wherein the inner shaft is operable to translate within the outer shaft by a predetermined amount, the inner shaft comprising an annular groove associated therewith, and the outer shaft comprising one or more channels associated with the one or more rollers, and further comprising a second slot associated therewith, wherein the second slot is generally parallel to the first axis and comprises a first extent and second extend associated therewith; and a third dowel pin generally fixed with respect to the body, wherein the third dowel pin is further associated with the second slot, wherein an end portion of the third dowel pin is operable to reside within the second slot;

wherein the one or more rollers are operable to generally maintain the position of the outer shaft relative to the hollow body via an interface between the one or more rollers, the drive pin, the third dowel pin, and the one or more lateral grooves, depending on a position of the drive pin with respect to the body.

16. The locating and clamping fixture of claim 15, wherein the outer shaft comprises a slot, and wherein the inner shaft comprises a pin, wherein the pin is operable to translate within the slot by the predetermined amount.

17. The locating and clamping fixture of claim 1, wherein the clamping arm further comprises a third cam surface, wherein the first cam follower is further operable to engage the third cam surface, and whereupon the engagement of the third cam surface by the first cam follower, the second cam surface is operable to be disengaged from the second cam follower.

18. The locating and clamping fixture of claim 14, wherein the locking mechanism comprises:

one or more lateral grooves associated with the body;

one or more rollers associated with the one or more lateral grooves;

an inner shaft and an outer shaft operably coupled with the drive pin, wherein the inner shaft is operable to translate within the outer shaft by a predetermined amount, the inner shaft comprising an annular groove associated therewith, and the outer shaft comprising one or more channels associated with the one or more rollers, and further comprising a second slot associated therewith, wherein the second slot is generally parallel to the first axis and comprises a first extent and second extend associated therewith; and a third dowel pin generally fixed with respect to the body, wherein the third dowel pin is further associated with the second slot, wherein an end portion of the third dowel pin is operable to reside within the second slot;

wherein the one or more rollers are operable to generally maintain the position of the outer shaft relative to the hollow body via an interface between the one or more rollers, the drive pin, the third dowel pin, and the one or more lateral grooves, depending on a position of the drive pin with respect to the body.

19. The locating and clamping fixture of claim 18, wherein the outer shaft comprises a slot, and wherein the inner shaft comprises a pin, wherein the pin is operable to translate within the slot by the predetermined amount.

* * * * *